Patented June 24, 1930

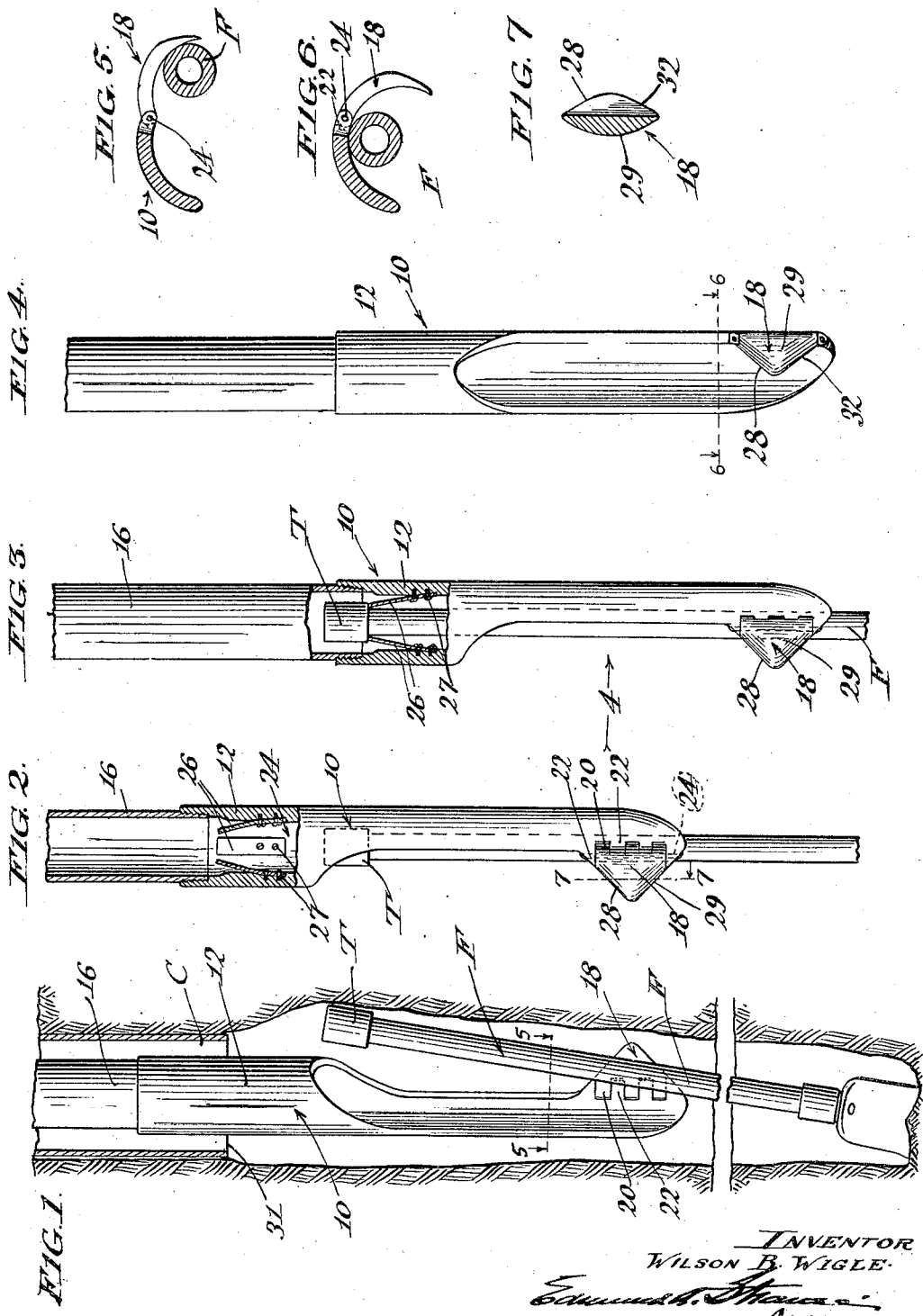

1,766,368

UNITED STATES PATENT OFFICE

WILSON B. WIGLE, OF COMPTON, CALIFORNIA

OIL-WELL FISHING TOOL

Application filed April 22, 1929. Serial No. 356,969.

The chief object of this invention is to provide a fishing tool adapted to remove a twist-off, or a disconnected length of drill pipe which is resting in such a position that it cannot be removed with an ordinary overshot.

Another object of this invention is to provide a fishing tool having means operated by rotation of the drill pipe which will engage and straighten the "fish" so that it may be recovered by use of a "fish" engaging means carried by the tool.

Briefly the invention resides in a tool comprising a channel shaped body having a substantially triangular shaped blade or scoop which is curved in transverse section and pivotally connected to the lower end thereof, said scoop adapted to open or swing outwardly by contact with the circulating fluid when the drill pipe to which the tool is connected is rotated. When in open position the scoop will partially encircle or "fish" (which may be resting in a diagonal plane or leaning against the side of the hole) and by rotation of the drill pipe, draw the "fish" into the channel of the tool, thereby bringing the same into a vertical position so that by lowering the tool an overshot or other "fish" engaging means provided in the upper end of the tool may operate in the usual manner to elevate and remove the "fish" from the well.

Referring to the drawings which illustrate a practical embodiment of the invention:

Fig. 1 is a sectional view through a well hole showing the fishing tool in elevation and in a position ready to straighten a "fish";

Fig. 2 is a view similar to Fig. 1 showing the tool as it appears after the "fish" has been straightened or after one half revolution of the tool;

Fig. 3 is a view similar to Fig. 2 parts being broken away and shown in section showing the overshot in operating position;

Fig. 4 is a side elevation of the fishing tool taken in the direction of the arrow 4 of Fig. 2, the "fish" not being shown;

Fig. 5 is a transverse sectional view taken on line 5—5 of Fig. 1;

Fig. 6 is a sectional view taken on line 6—6 of Fig. 4;

Fig. 7 is a sectional view of the scoop taken on line 7—7 of Fig. 2.

Referring more specifically to the drawings the body of the tool is designated at 10 which is substantially channel shaped, terminating at its upper end in a cylindrical head 12 which is internally threaded at 14 to receive the drill pipe 16. Pivotally connected at the lower end of the body 10 is a blade or scoop 18 which is substantially triangular in side elevation and curved in horizontal section.

The scoop 18 is provided with a plurality of ears 20 which mesh with ears 22 on the body 10 and is pivotally connected to the body by a pin 24 which extends through an opening in the ears 20 and 22. When the scoop 18 is in closed position as shown in Figs. 4 and 5 its curvature corresponds to that of the head 12, thereby allowing the tool to be easily lowered within the casing —C—. An overshot 24 has been illustrated in connection with my tool, but it will be understood that other "fish" engaging mechanisms may be as advantageously employed depending upon the character of the object fished for. The overshot shown is preferably formed integral with the head 12 and consists of a plurality of spring metal dogs 26 (of usual construction employed in overshots) the lower ends of which rest in recesses formed in the walls of the head 12 and are held in place thereon by screws 27.

In operation the tool is lowered through the casing —C— to a position so that it will be in proximity to the fish —F—; the drill pipe is then rotated clockwise the action of which will cause the scoop to open as clearly shown in Fig. 5 due to the resistance of the circulating fluid against the inner face of the scoop. In open position the scoop will have sufficient range of action to engage and partially encircle the "fish". Further rotation of the tool due to the curved inner face of the scoop will draw the "fish" from the slanting position shown in Fig. 1 to the vertical position shown in Fig. 2.

Having brought the "fish" into a vertical position the overshot 24 formed on the upper end of the tool is now employed to remove the "fish", this being accomplished in the usual manner by first lowering the tool so that the dogs 26 of the overshot are below the coupling or joint —T— of the "fish" then raised. On upward movement the dogs will engage the under side of the coupling and thereby carry the "fish" upward with the tool. The scoop is returned to closed position by the upper slanting edge 28 and curved face 29 of the scoop engaging the lower edge 31 of the casing —C— during upward movement of the tool, thereby permitting the tool to pass upward through the casing during the operation of removing the "fish". The lower slanting edge 32 of the scoop prevents same from getting caught on any obstructions while the tool is being lowered.

I claim:

A fishing tool comprising a hollow cylindrical body member having the greater portion of its wall cut away to form a pair of longitudinally extending edges, a substantially triangular shaped scoop hingedly secured to one of said body member edges at the lowermost end, said tool being of arcuate form in cross section and adapted to open when the tool is rotated and draw the object fished for into the channel formed by the cut away portion of the body member, and a plurality of spring dogs secured to the inner surface of the body member beyond the cut away portion, the free ends of said dogs projecting upwardly and towards each other for engaging the object fished for to elevate the same out of the well.

In testimony whereof I affix my signature.

WILSON B. WIGLE.